United States Patent [19]
Herrmann et al.

[11] 3,981,249
[45] Sept. 21, 1976

[54] LOAD BEARING PALLET

[75] Inventors: John R. Herrmann, Tustin; Robert L. Alexander, Newport Beach, both of Calif.

[73] Assignee: G. S. Beckwith Gilbert, Greenwich, Conn.

[22] Filed: Oct. 17, 1974

[21] Appl. No.: 515,498

[52] U.S. Cl. .............................. 108/52.1; 52/664; 52/668; 52/758 R; 108/53.3; 403/237; 403/346; 403/382
[51] Int. Cl.² ........................................ B65D 19/30
[58] Field of Search ................... 108/51–58, 108/161; 206/386; 248/346; 211/182; 52/758 R, 753 D, 664, 668, 720; 403/170, 173, 174, 177, 178, 282, 285, 346, 382, 403, 233, 237

[56] References Cited
UNITED STATES PATENTS

| | | | |
|---|---|---|---|
| 2,098,752 | 11/1937 | Miller | 403/237 X |
| 2,221,934 | 11/1940 | Ferris | 403/170 |
| 2,544,743 | 3/1951 | Vrabcak | 108/52 |
| 3,227,108 | 1/1966 | Greaves | 108/53 |
| 3,701,326 | 10/1972 | Herman | 108/53 |
| 3,748,814 | 7/1973 | Cribben | 52/668 |
| 3,762,344 | 10/1973 | Chez | 108/51 X |
| 3,851,981 | 12/1974 | Corsi et al. | 403/237 |

*Primary Examiner*—Roy D. Frazier
*Assistant Examiner*—William E. Lyddane

[57] ABSTRACT

A load bearing two-way pallet fabricated as a permanent piece of hardware from tubular members integrally joined with transverse load bars embraced and enclosed by support rails. A common tube cross section is employed throughout with intermediate notching that reinforces complimentary engagement of one notched member with the other, and with end notching that reinforces the terminal ends of the tube members that are engaged with an embracing tube member. A feature is the method of manufacture wherein a rectangular and planar ladder-form is initially fabricated and the members thereof interjoined, followed by bending reformation of the rail members thereof so as to establish upwardly open transversely disposed channels for the reception of lifting forks, and openings beneath raised load bearing bars so as to receive the longitudinal insertion of lifting forks.

4 Claims, 10 Drawing Figures

LOAD BEARING PALLET

BACKGROUND

Pallets have widespread use in industry to warehouse and ship goods. The goods are supported upon the pallets directly or in containers such as boxes and/or bags and the like, and it is usual practice to handle the palleted goods by means of fork-lift trucks; to place and remove goods upon and from the pallets; to shuttle the palleted goods from place to place; and to position the palleted goods in carriers for transport. The fork dimensions of the lift trucks are standardized and to the end that the usual pallet is of standard or modular dimensions. However, the usual pallet is a wooden panel or slats secured to a pair of wooden rails, and subject to splintering and cracking under severe loads; also prone to being damaged by a misguided entry of the forks of a lift truck. Similar objection is experienced as relates to other pallet constructions of sheet metal, constructions involving extrusions of light metals, and constructions involving plastics; and all of which are quite costly when their useful life is considered.

With the foregoing generalities in mind, it is an object of this invention to provide a pallet in the nature of permanent hardware, utilizing structural forms of high strength and of durable material. Consequently, practicality is realized in a relatively inexpensive product in the form of a pallet of moderate weight and adapted to be stored in a minimum of space; and all to the end that the pallets can be furnished to the industries on a commercially economical basis. With the present invention, rectangular steel tubing is employed and embraced in a fabrication involving a minimum of securement steps and embodied in cooperative members that interlock mechanically and which are formed to present a platform spaced parallel to and above a supporting plane.

The use of metals in the fabrication of pallets has not proven altogether satisfactory in the past, due to the fact that cost and weight factors require thinness and malleability to enable fabrication. Consequently, a suitable metal pallet has been too costly when made durable enough, and reversely has been too vunerable to damage when made of light construction. Also, pallets made of synthetic materials such as formed plastics and so called fiber-glass, tend to fracture and delaminate. Therefore, wooden pallets are resorted to despite the deficiencies hereinabove pointed out. However, with the present invention the above deficiencies and objections are obviated in a simple and practical structure which involves steel tubing that is structurally stable in itself and which is comprised of members that are integrally joined and devoid of loose ends. With the pallet hereinafter disclosed, there are longitudinal support rails which carry transverse load bars, the rails being formed so as to permit fork-lift placement and removable of the load upon said bars, and the rails being disposed so as to permit fork-lift elevation of the load placed upon said bars. As is common with so-called two-way pallets, the transverse insertion of the forks implements load placement and removable, while longitudinal insertion implements palleted lifting of the load.

The fabrication of prior art pallets has employed numerous methods and means of material preparation and fastening together of the members involved. Wooden pallets are made from members that are sawed to size and nailed, screwed and bolted together. Metal pallets are usually made of members that are stamped and formed to shape and then fastened as by rivet or screw fasteners and by means of welding. Plastic pallets are molded and cured. And all of these processes are time consuming and costly. However, with the present invention a single tube cross section is employed, preferably a square section of moderate wall thickness, and in practice of a tough steel that is capable of being bent by power operated tools with dies, it being an object to provide a method of manufacture whereby a pallet characterized by elevated load bearing bars is formed from a planar fabrication of integrally joined tube members, the bars being supported by said members which are the members that are formed while the said load bearing bars remain straight and in the elevated supporting plane.

DRAWINGS

The various objects and features of this invention will be fully understood from the following detailed description of the typical preferred form and application thereof, throughout which description reference is made to the accompanying drawings, in which.

PREFERRED EMBODIMENT

This pallet is a two way construction adapted to side loading and unloading and to side lifting, and also adapted to end lifting for transport and/or placement. That is, the pallet configuration is that type which transversely receives the forks of a lift truck to place upon and remove a load therefrom and as well to be lifted with the load thereon, and which longitudinally receives the forks of a lift truck to elevate the pallet with the load thereon. The pallet comprises, generally, a plurality of spaced load bars B disposed to span between spaced support rails R. The load bars B are the transverse members while the support rails R are the longitudinal members; and all of which are made of a common cross section, preferably of square tubing. A feature of this pallet is the perimeter member T1 that embraces members T2 and T3, and which forms opposite end bars B and opposite side rails R. As shown, member T1 is one continuous length of tubing in rectangular plan form and joined into a ring as by butt welding at 10 (see FIG. 3). In accordance with the method of manufacture, the ring shaped member T1 is initially a flat rectangle that is wrapped about the cross members T2 comprising the load bars B which are prepared as next described.

Figure 1:
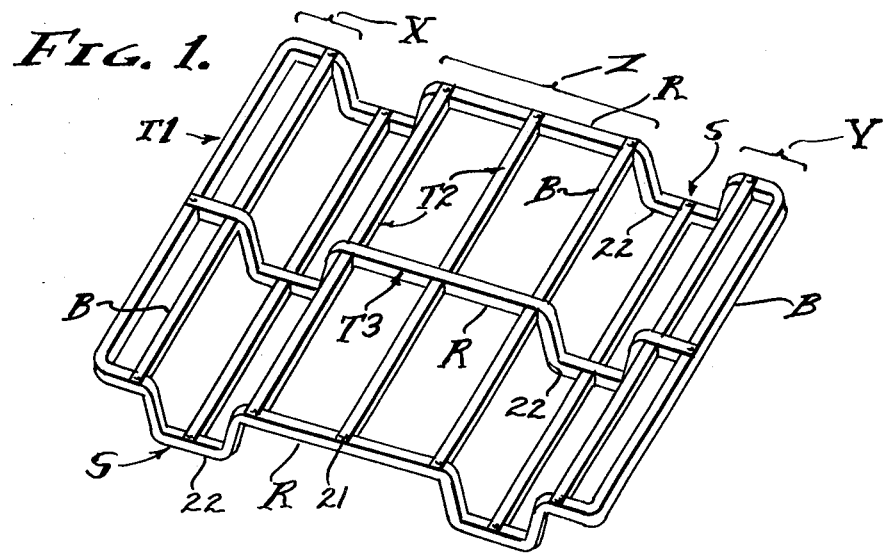
FIG. 1 is a perspective view of the pallet in its finished form.
Figure 2:
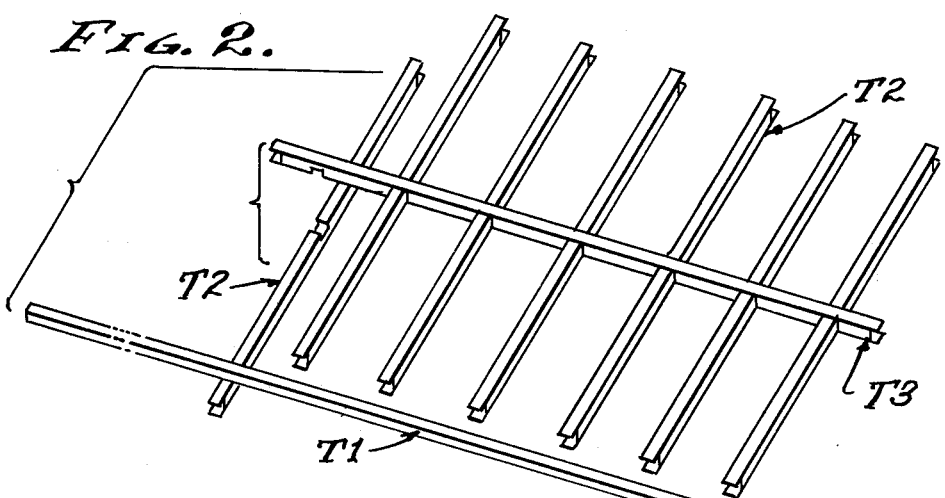
FIG. 2 is a perspective view of the pallet members arranged together in their initial ladder-form.

The members T2 which comprise the load bars B are alike and as shown they are identical tubular members that remain straight with features to receive and position the support rails R engaged therewith. In practice there is a center support rail R in the form of center member T3, initially a straight member (see FIG. 2), in which case the intermediate load bars B embodied in the members T2 are notched at their centers and faced upwardly so as to receive complementary notches faced downwardly in the center rail R embodied in the member T3. A feature of the invention is the preparation of these notches in the like and preferably identical tube members which comprise the members T2 and T3, and that are initially pressed together in a ladder formation as illustrated in FIG. 2. It will be observed that the locations of the notches along member T3 predetermine the ultimate location of bars in the finished ladder-form of the FIG. 3 configuration prior to the rail formation that establishes the elevated platform configuration of the pallet as shown in FIG. 1.

Figure 4:
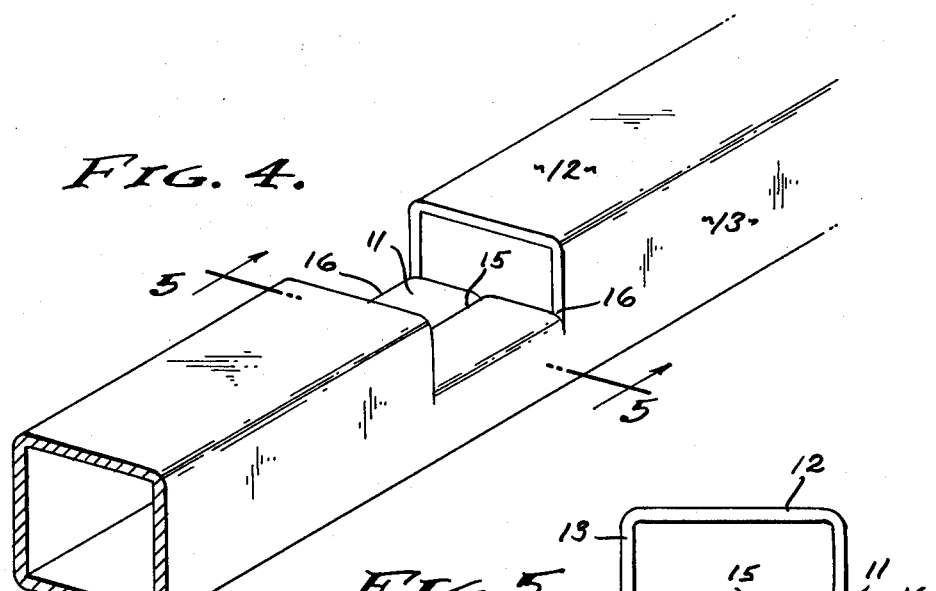
FIG. 4 is an enlarged fragmentary perspective view of the intermediate notching of the tube members.
Figure 5:
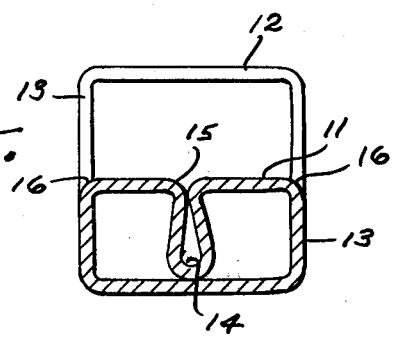
FIG. 5 is a transverse section through a notch taken as indicated by line 5—5 on FIG. 4.
Figure 6:
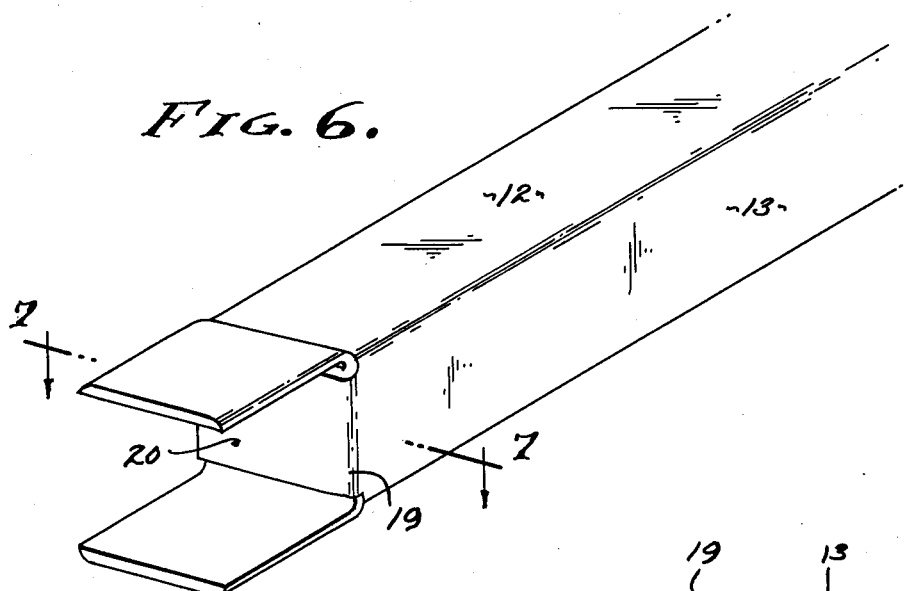
FIG. 6 is an enlarged fragmentary perspective view of the end portion of a notched tube member.
Figure 7:
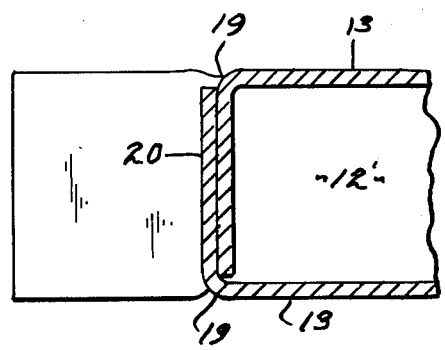
FIG. 7 is a plan section therethrough taken as indicated by line 7—7 on FIG. 6.

Referring now to the intermediate notches as they are detailed in FIGS. 4 and 5, said notches are identically formed in the members T2 and T3 of identical cross section, and each notch being formed to the mid plane of the tubular cross section respectively. A feature of the notch is the "pierce and form" method of formation thereof which preserves the metal wall without the production of scrap, while utilizing the displaced wall to establish the bottom 11 of the notch. As shown, the rectangular or square tube is pierced along a pair of spaced parallel lines at one flat side wall 12, and is sheared to the mid plane of the spaced adjoining side walls 13. The flat side wall 12 is folded inwardly at its center portion 14 so as to precede the inward folding of side walls 13 that retain their initial corners 15 while being right angularly bent at 16 to establish the bottom 11 at said mid plane of the tube. The aforementioned shear lines are spaced and opposed so as to frictionally receive the complementary notched members which are subsequently pressed together for tight coplanar engagement.

In accordance with the preferred form of this invention, the tube members T2 and T3 are also notched at their opposite terminal ends, so as to mechanically interfit with the continuous peripheral member T1. These terminal end notches are identically formed so as to embrace the common cross section of member T1, being formed by the displacement of the opposite side walls 13 at the open end portion of the tube member. As shown, each side wall end portion is sheared from the top and bottom walls 12 and 12' at the plane of the inner surfaces thereof respectively, and bent at 19 to fold inwardly, one fold preceeding the other so as to be disposed adjacently in a plane normal to the tube axis and thereby establishing a bottom 20. The remaining end portions of the top and bottom walls are joggled outwardly and into parallism, as shown, so as to embrace the top and bottom walls of the peripheral tube member T1. Thus, the opposite terminal ends of the tube members T2 and T3 are reinforced and fit flat against the inner side wall of member T1, the joggled end portions being welded as indicated at 21.

Figure 3:
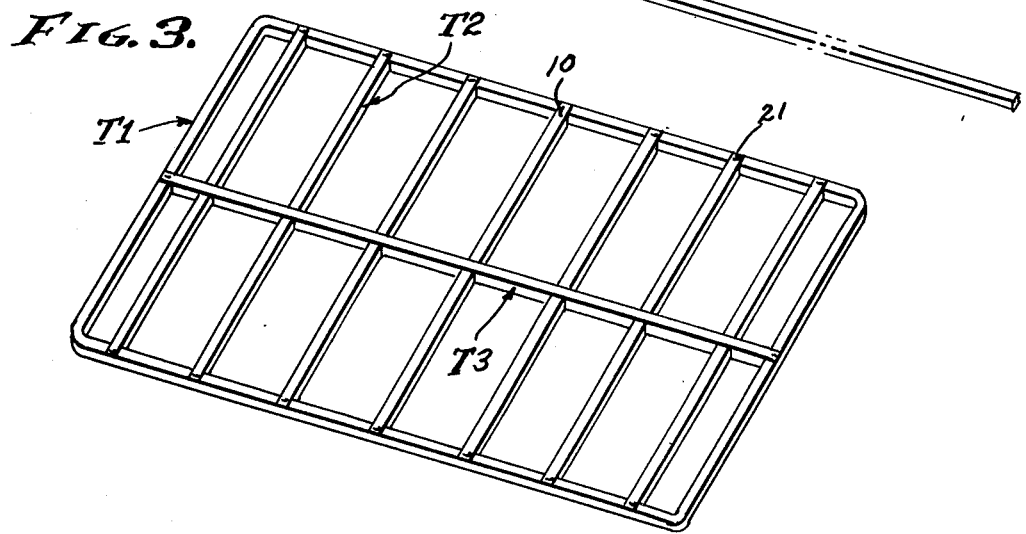
FIG. 3 is a perspective view of the planar ladder-form of the pallet embraced by its peripheral ring member.

In accordance with this method of manufacture, the initially flat ladder formation of members T2 and T3 is embraced by the formation of member T1 into its rectangular configuration as shown in FIG. 3. That is, the member T1 is wrapped around the ladder-form of members T2 and T3 and butt welded at 10, engaging in the terminal end notches of said members in the form of bars and rails, all in a flat plane as best illustrated in FIG. 3. Subsequently, the rails R are formed into supports at S inward of the end bars B formed thereby and establishing marginal support areas X and Y co-planar with a central support area Z. As shown, the rails R are turned or bent down convergently and into a foot 22 displaced downwardly from and parallel to the co-planar rail portions of said areas X, Y and Z. Consequently, upward opening transverse channels are provided for the reception of the lift forks of a truck, while transverse openings are provided by the ladder formation for the reception of the lift forks beneath the load bearing bars B which are simultaneously engageably lifted by said forks spaced apart to bear the load inside the side rails R.

Figure 9:
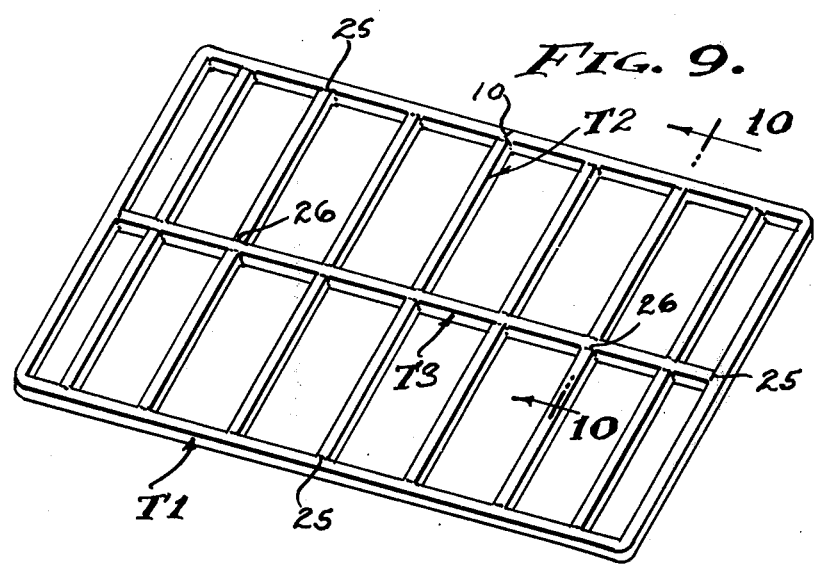
FIG. 9 is a perspective view similar to FIG. 3, illustrating a second form of pallet wherein the right angularly related members are butt welded.
Figure 10:
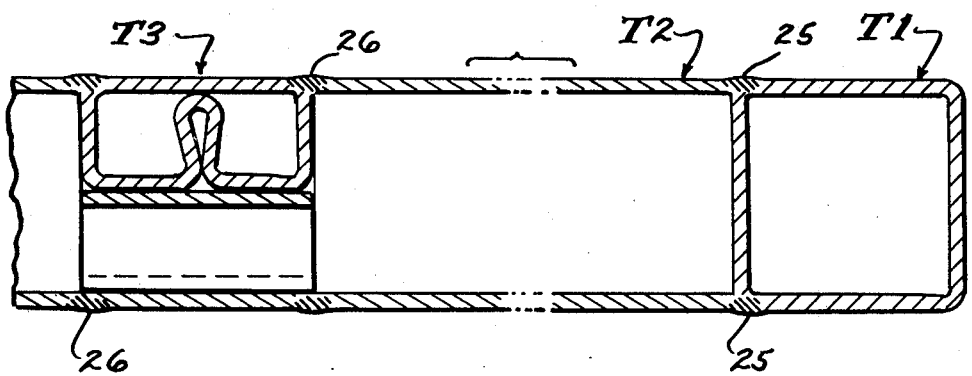
FIG. 10 is an enlarged detailed sectional view taken as indicated by line 10—10 on FIG. 9.

In accordance with the second form of pallet disclosed in FIGS. 9 and 10, the right angularly related tube members T1 and T2 are butt welded at each point of joinder, to be distinguished from the first disclosed form of pallet which can be assembled and maintained as a unit with a single butt weld at 10. When complete integrity is desired, each and every joint can be welded as indicated in FIGS. 9 and 10; by welding the cross members T2 and the member T3 at 25 where they abutt against the inner side wall of the perimeter member T1; and by welding the crossed members T2 and T3 at 26 where the complementary notches thereof are pressed together. By welding at 25 and 26, as shown, the rigidity of the tubular "box" sections is transferred one into the other for maximum strength.

Figure 8:
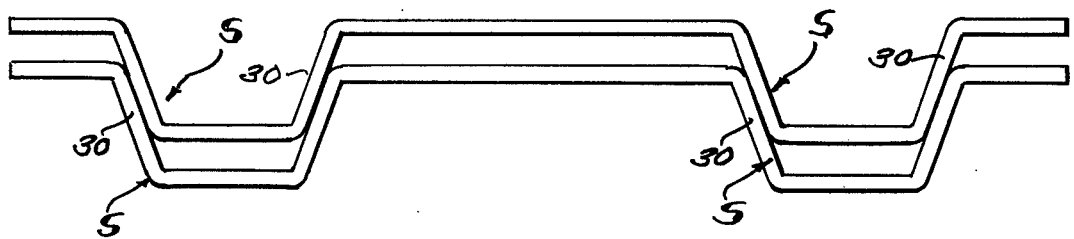
FIG. 8 is a side view illustrating the stacking capability of the pallets.

Referring now to the stacking arrangement illustrated in FIG. 8, the downward formation of the legs 30 which establish the supports S is shown at a substantial angle of about twenty degrees, whereby stacking results in a substantial telescoping of one pallet support into the other while maintaining a spaced relationship between the load bearing members of one pallet overlying the other. Consequently, lifting forks can be applied beneath a selected pallet, for lifting the same from the underlying stack; or for lifting a group of pallets from a remaining underlying group. Also, the lifting forks can be selectively inserted laterally as well as longitudinally to engage beneath the load bearing members of the pallet to be lifted.

From the foregoing it will be seen that the pallet is formed of a common cross section of tubing which is basically of high strength. The notching is performed with no waste of material and the methods of notching reinforce the tube members, while their interengagements complement each other. The placement of the notches in the central member T3 locates the transverse bars B, thereby establishing the initial flat ladder-form which is then embraced within a closed ring member T1, all tube ends being closed and anchored. Upon completion of the integral ladder formation, the supports S are formed therein by bending of the rail members only, the lowered load bearing bars B spanning the foot portions S remaining straight for coextensive engagement upon a supporting plane, and the raised load bearing bars B spanning the areas X, Y and Z remaining straight and in coplanar alignment for lifting engagement by the forks of a lift truck. The common tube form is retained throughout for torsional rigidity which is transferred from member to member, and with the configuration of the tubular cross section as related to the substantial wall thickness thereof, as illustrated, a durable relatively light weight pallet is provided.

Having described only a typical preferred form and application of our invention, we do not wish to be limited or restricted to the specific details herein set forth, but wish to reserve to ourselves any modifications or variations that may appear to those skilled in the art:

We claim:

1. A load bearing pallet fabricated of elongated formable members of tubular cross section for torsional stability, there being a frame work comprised of a plurality of spaced and parallel transversely disposed and rigid load bearing members in a common plane with and extending between and intersecting spaced and parallel longitudinally disposed rigid rail members, said transversely and longitudinally disposed tubular members being joined at notched interconnections thereof wherein each tubular member is notched with a seat bottom disposed normal to said tubular cross section and formed by piercing the same at spaced parallel lines with one side thereof depressed to the mid plane of the tube, the seat bottom of the notch in one member bearing against the seat bottom of the notch in the complementary intersecting member.

2. The load bearing pallet with notched interconnections of complementary members as set forth in claim 1, wherein said tubular members are of rectangular cross section with said seat bottoms parallel with the top and bottom sides of said tubular members respectively.

3. A load bearing pallet fabricated of a framework comprised of a plurality of spaced and parallel transversely disposed and rigid load bearing members in a common raised plane extending between and intersecting spaced and parallel longitudinally disposed and rigid rail members for the transverse reception of a lifting element engageable beneath the same to lift the pallet with and without a load thereon, the said first and second mentioned members being of tubular cross section for torsional stability and notched with a seat bottom disposed normal to said tubular cross section and formed by piercing the same at spaced parallel lines and depressing one side thereof to the midplane thereof, the seat bottom of the transversely disposed member bearing against the complimentary seat bottom of the longitudinally disposed member at each notched intersection thereof, respectively, said rail members being depressed inward from their ends with aligned upward openings for the transverse reception of a lifting element to place and remove a load onto and from the first mentioned load bearing members, and with transverse openings beneath the first mentioned load bearing members for the longitudinal insertion of the lifting element to lift the pallet with and without a load thereon.

4. The load bearing pallet with notched interconnections of complementary members as set forth in claim 3, wherein said tubular members are of rectangular cross section with said seat bottoms parallel with the top and bottom sides of said tubular members respectively.

* * * * *